US012079725B2

United States Patent
Lin et al.

(10) Patent No.: US 12,079,725 B2
(45) Date of Patent: Sep. 3, 2024

(54) CONVOLUTIONAL NEURAL NETWORKS WITH ADJUSTABLE FEATURE RESOLUTIONS AT RUNTIME

(71) Applicant: Adobe Inc., San Jose, CA (US)

(72) Inventors: Zhe Lin, Fremont, CA (US); Yilin Wang, Sunnyvale, CA (US); Siyuan Qiao, Baltimore, MD (US); Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 1037 days.

(21) Appl. No.: 16/751,897

(22) Filed: Jan. 24, 2020

(65) Prior Publication Data
US 2021/0232927 A1 Jul. 29, 2021

(51) Int. Cl.
  *G06N 20/00* (2019.01)
  *G06N 3/082* (2023.01)
(52) U.S. Cl.
  CPC ............. *G06N 3/082* (2013.01); *G06N 20/00* (2019.01)
(58) Field of Classification Search
  CPC .................................. G06N 3/082; G06N 20/00
  See application file for complete search history.

(56) References Cited

PUBLICATIONS

Albelwi, S., et al, A Framework for Designing the Architectures of Deep Convolutional Neural Networks, [retrieved on Mar. 2, 2022]. Retrieved from Internet :< https://www.mdpi.com/1099-4300/19/6/242> (Year: 2017).*
Im, D., et al, DT-CNN: Dilated and Transposed Convolution Neural Network Accelerator for Real-time Image Segmentation on Mobile Devices, [retrieved on Mar. 2, 2023]. Retrieved from Internet: <https://ieeexplore.ieee.org/abstract/document/8702243> (Year: 2019).*
Liu, P., et al, Multi-level Wavelet-CNN for Image Restoration, [retrieved on Mar. 2, 2023]. Retrieved from Internet:<https://openaccess.thecvf.com/content_cvpr_2018_workshops/w13/html/Liu_Multi-Level_Wavelet-CNN_for_CVPR_2018_paper.html> (Year: 2018).*
Marin, D., et al, Efficient Segmentation: Learning Downsampling Near Semantic Boundaries, [retrieved on Mar. 2, 2023]. Retrieved from Internet: <https://openaccess.thecvf.com/content_ICCV_2019/html/Marin_Efficient_Segmentation_Learning_Downsampling_Near_Semantic_Boundaries_ICCV_2019_paper.html> (Year: 2019).*

(Continued)

*Primary Examiner* — Miranda M Huang
*Assistant Examiner* — Bart I Rylander
(74) *Attorney, Agent, or Firm* — Kilpatrick Townsend & Stockton LLP

(57) ABSTRACT

In some embodiments, an application receives a request to execute a convolutional neural network model. The application determines the computational complexity requirement for the neural network based on the computing resource available on the device. The application further determines the architecture of the convolutional neural network model by determining the locations of down-sampling layers within the convolutional neural network model based on the computational complexity requirement. The application reconfigures the architecture of the convolutional neural network model by moving the down-sampling layers to the determined locations and executes the convolutional neural network model to generate output results.

20 Claims, 8 Drawing Sheets

(56) References Cited

PUBLICATIONS

Sharma, H., et al, From High-Level Deep Neural Models to FPGAs, [retrieved on Mar. 2, 2023]. Retrieved from Internet:<https://ieeexplore.ieee.org/abstract/document/7783720> (Year: 2016).*

Suda, N., et al, Throughput-Optimized OpenCL-based FPGA Accelerator for Large-Scale Convolutional Neural Networks, [retrieved on Mar. 2, 2023]. Retrieved from Internet:<https://dl.acm.org/doi/abs/10.1145/2847263.2847276> (Year: 2016).*

Sun, Y., et al, Automatically Evolving CNN Architectures Based on Blocks, [retrieved Mar. 2, 2023]. Retrieved from Internet: <https://arxiv.org/abs/1810.11875> (Year: 2019).*

Zhang, B., et al, A Lightweight and Discriminative Model for Remote Sensing Scene Classification With Multidilation Pooling Module, [retrieved on Mar. 2, 2023]. Retrieved from Internet:<https://ieeexplore.ieee.org/abstract/document/8746195> (Year: 2019).*

Morgado, P., et al, NetTailor: Tuning the architecture, not just the weights, [received Jun. 29, 2023]. Retrieved from Internet:<https://openaccess.thecvf.com/content_CVPR_2019/html/Morgado_NetTailor_Tuning_the_Architecture_Not_Just_the_Weights_CVPR_2019_paper.html (Year: 2019).*

Krizhevsky, Alex, et al., "Imagenet Classification With Deep Convolutional Neural Networks," in Advances in Neural Information Processing Systems 25 (F. Pereira, C. J. C. Burges, L. Bottou, and K. Q. Weinberger, eds.), 2012, 9 pages.

Chen, Liang-Chieh, et al, "Deeplab: Semantic Image Segmentation With Deep Convolutional Nets, Atrous Convolution, And Fully Connected CRFs," IEEE Transactions Pattern Analysis Machine Intelligence, vol. 40, Issue No. 4, Apr. 2018, arXiv:1606.00915v2, May 12, 2017, 14 pages.

Yu, Jiahui, et al., "Slimmable Neural Networks," arXiv preprint arXiv:1812.08928, Dec. 2018, 12 pages.

Ioffe, Sergey, et al., "Batch Normalization: Accelerating Deep Network Training By Reducing Internal Covariate Shift", arXiv preprint arXiv:1502.03167, Mar. 2, 2015, 11 pages.

Wu, Yuxin, et al. "Group Normalization," in Proceedings of the European Conference on Computer Vision (ECCV), arXiv: 1803.08494v3, Jun. 11, 2018, 10 pages.

Qiao, Siyuan, et al., "Weight Standardization," arXiv preprint arXiv:1903.10520, Mar. 25, 2019, 10 pages.

Yu, Jiahui, et al., "Universally Slimmable Networks and Improved Training Techniques," arXiv preprint arXiv:1903.05134, Oct. 20, 2019, 11 pages.

He, Kaiming, et al, "Deep Residual Learning For Image Recognition," in 2016 IEEE Conference on Computer Vision and Pattern Recognition, CVPR 2016, Jun. 27-30, 2016, pp. 770-778, 9 pages.

Kuen,, Jason, et al., et al, "Stochastic Downsampling For Cost-Adjustable Inference And Improved Regularization In Convolutional Networks", In Proceedings of the IEEE Conference on Computer Vision and Pattern Recognition, 2018, pp. 7929-7938, 10 pages.

* cited by examiner

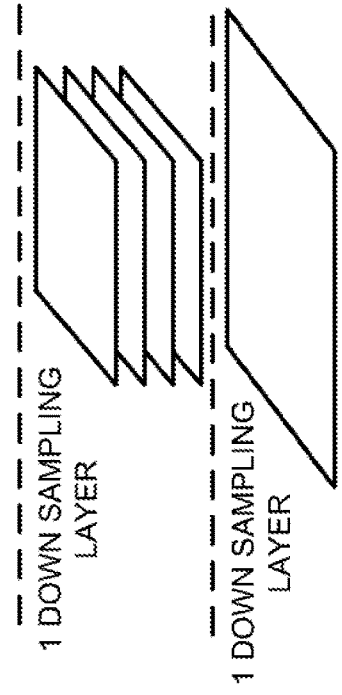
FIG. 4A
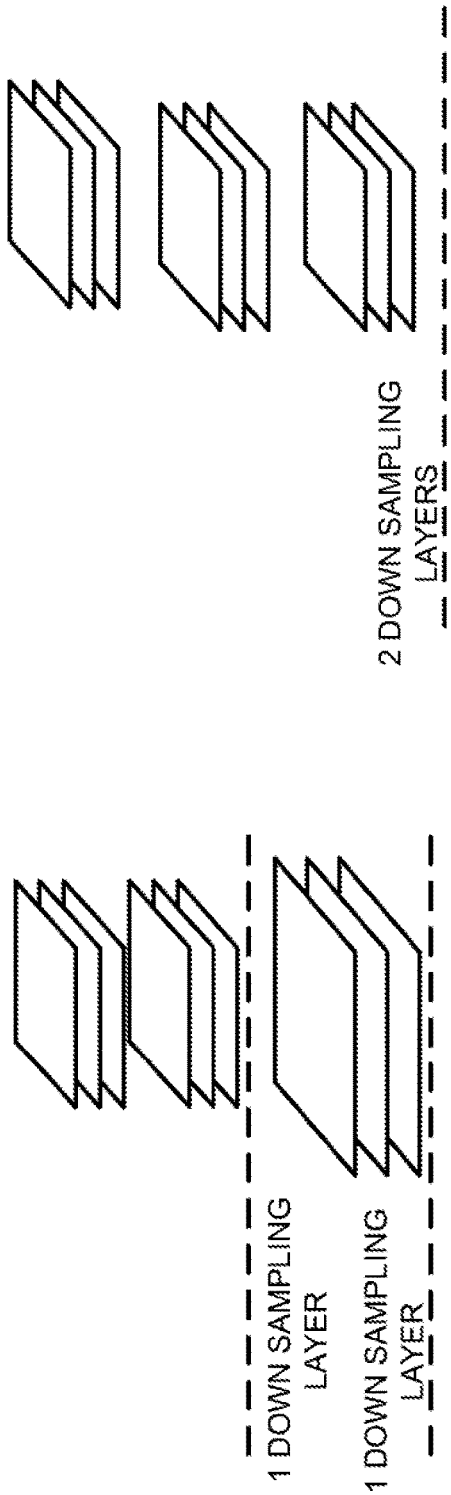
FIG. 4B
FIG. 4D
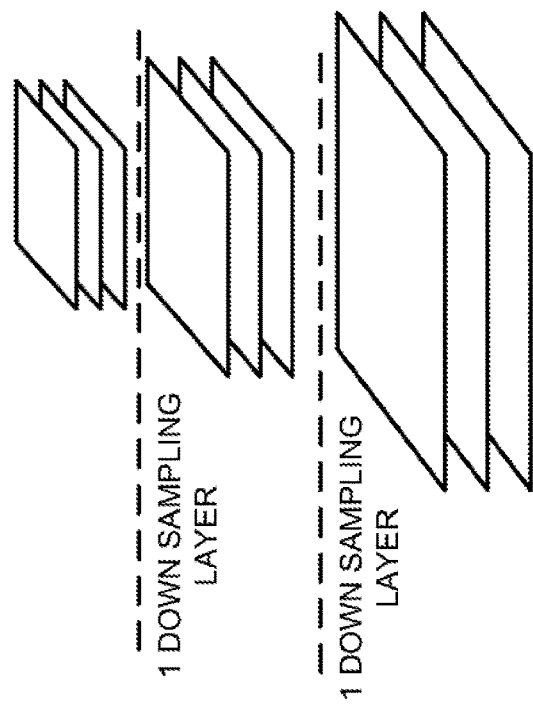
FIG. 4C

CONVOLUTIONAL NEURAL NETWORKS WITH ADJUSTABLE FEATURE RESOLUTIONS AT RUNTIME

TECHNICAL FIELD

This disclosure relates generally to convolutional neural networks. Specifically, the present disclosure involves training and executing a convolutional neural network with adjustable feature resolutions at runtime.

BACKGROUND

Machine learning models, such as neural networks, have become more and more popular in applications executed on various types of computing devices. For example, machine learning models are often included in applications designed for execution on mobile devices, such as mobile phones, tablets, laptops, augmented reality devices, and so on. Computational resources available for executing the machine learning models are generally different on different devices due to the different computational powers of these devices. In addition, computational resources available for executing a machine learning model on a single device may be different at different times because the number of applications or models executed simultaneously on the device at the same time may change over time. This variability in available computing resources across devices or even on a single device poses challenges to traditional machine learning models that have a fixed model architecture.

SUMMARY

Certain embodiments involve training and executing a convolutional neural network with adjustable feature resolutions at runtime. In one example, a computing device determines a computational complexity requirement for a convolutional neural network model executed on the computing device. The convolutional neural network model includes multiple convolutional layers and one or more down-sampling layers. A down-sampling layer is configured to down-sample input data of the down-sampling layer. The computing device further determines a location for each of the one or more down-sampling layers relative to the convolutional layers within the convolutional neural network. The determination is made based on the computational complexity requirement. The computing device reconfigures the convolutional neural network by moving the one or more down-sampling layers to the respective determined locations, and executes the convolutional neural network model to generate an output result.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIGS. 4A-4D depict examples of architectures of a convolutional neural network model when the down-sampling layers are placed at different locations, according to certain embodiments of the present disclosure.

DETAILED DESCRIPTION

Figure 1:
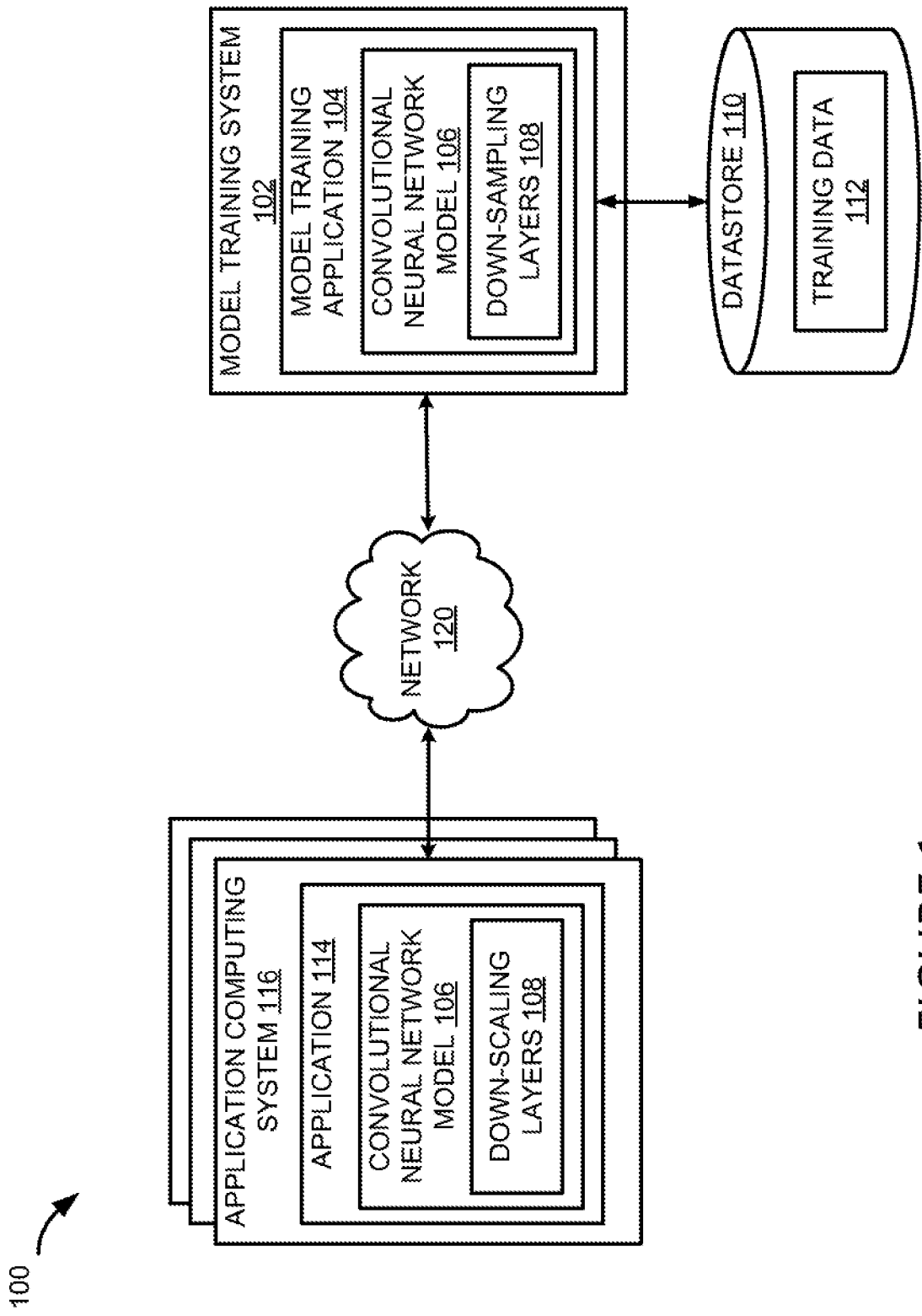
FIG. 1 depicts an example of a computing environment for training and executing a convolutional neural network with adjustable feature resolutions at runtime, according to certain embodiments of the present disclosure.

The present disclosure involves training and executing a convolutional neural network with adjustable feature resolutions at runtime, also referred to as a "spatially slimmable network." As discussed above, traditional machine learning models, such as neural networks, cannot meet the dynamic computational complexity requirements on a same device or across different devices. Certain embodiments described herein address these limitations by adjusting the computational resource consumption of a neural network model by changing resolutions of the feature maps processed by the nodes in the network. For instance, an application receives a request to execute a convolutional neural network model. The application determines the computational complexity requirement for the neural network based on the computing resource available on the device and further determines the locations of down-sampling layers of the convolutional neural network model accordingly. The application reconfigures the architecture of the convolutional neural network model by moving the down-sampling layers to the determined locations and executes the convolutional neural network model to generate output results.

The following non-limiting example is provided to introduce certain embodiments. In this example, an application, such as an image processing application, is configured to execute a convolutional neural network model on a device, for example, a model for recognizing an object in an image. The convolutional neural network model can include an input layer, an output layer and a set of convolutional layers between the input layer and the output layer. The convolutional neural network model can further include one or more down-sampling layers configured to reduce the resolution of feature maps processed by a convolutional layer. The application receives a request to execute the convolutional neural network model (e.g., to perform the object recognition). The application determines the computational complexity requirement for the convolutional neural network, for example, based on the computing resource available on the device. Available computing resources are those that are present on and/or not currently utilized by the device. The computational complexity requirement can be used to determine whether the complexity of the convolutional neural network model should be reduced.

The application further determines the locations to which the one or more down-sampling layers should be moved within the convolutional neural network model (referred to herein as the "locations of the down-sampling layers") so that the computational complexity of the model can meet the computational complexity requirement. For example, if it is determined based on the computational complexity requirement that the computational complexity of the model should be reduced, the application can determine that the locations of the down-sampling layers should be closer to the input layer so that the feature maps processed by the convolutional layers of the convolutional neural network model have a lower resolution and thus require less computing resources. On the other hand, if the computational complexity of the model can be increased because more computing resources become available, the locations of the down-sampling layers can be selected to be closer to the output layer. As a result, feature maps with higher resolutions can be processed by the convolutional layers to achieve higher accuracy for the output results. The application moves the down-sampling layers to the determined locations and executes the convolutional neural network model to generate the output results, such as the recognized objects in an input image.

In order to obtain the convolutional neural network model with adjustable feature resolutions at runtime, a model training application can perform a dynamic model training process. In this process, for each iteration of the training, the model training application randomly selects a location for each of the down-sampling layers and moves the down-sampling layers to the respective locations. The model training application also performs weight adjustments for each of the convolutional layers of the convolutional neural network model to normalize the weights of connections associated with a node of the convolutional layer. The normalization can be based on statistics of the weights of connections associated with the node.

The model training application 104 inputs training samples to the convolutional neural network model through the input layer. The input layer passes the training samples as the feature maps to the next convolutional layer. The model training application further determines a dilation level for the filters used in the current convolutional layer based on the locations of the down-sampling layers and dilates the filters accordingly. The dilated filters match the resolution of the feature maps in the convolutional layer. The convolutional layer processes the feature maps utilizing the dilated filters to generate output feature maps. The output feature maps are further normalized based on the statistics of feature maps generated by the nodes in the convolutional layer. The output feature maps can be further down-sampled if a down-sampling layer is placed after the convolutional layer. The processed feature maps can be passed to the next convolutional layer and the above process can be repeated for the next convolutional layer until the output layer is reached. The output results of the convolutional neural network model are compared with the true output results in the training samples to determine a loss function and further determine whether further iterations of training are needed. If so, parameters of the convolutional neural network model can be adjusted based on the loss function and another iteration of training as described above can be initiated. If the training is finished, the trained convolutional neural network model can be deployed to computing devices for execution.

As described herein, certain embodiments provide improvements in convolutional neural network models by training and executing a convolutional neural network model where the resolutions of feature maps are adjustable at runtime to meet various runtime computational complexity requirements. The dynamic training process allows for the convolutional neural network model to be trained with different architectures (i.e., different locations of the down-sampling layers). Additional adjustments during the training, such as the weight adjustment, the feature map normalization, and the dilation of filters ensure that the convolutional layers function properly to achieve sufficient accuracy even if the resolutions of the feature maps are different at different times. As a result, the trained neural network can execute with different architecture configurations with sufficient accuracy and the computational complexity can be reduced quadratically.

Example Operating Environment for Spatially Slimmable Networks

Referring now to the drawings, FIG. 1 depicts an example of a computing environment 100 for training and executing a convolutional neural network with adjustable feature resolutions at runtime, also referred to herein as a spatially slimmable network. The computing environment 100 includes a model training system 102, which can include one or more processing devices that execute a model training application 104 to train a convolutional neural network model 106 with adjustable feature resolutions at runtime. The computing environment 100 further includes a datastore 110 for storing data used in training the convolutional neural network model 106, such as the training data 112.

The convolutional neural network model 106 can include an input layer, an output layer and a set of convolutional layers located between the input layer and the output layer. A convolutional neural network model 106 has adjustable feature resolutions if the size of the features (also referred to as "feature maps") that are being processed by the convolutional layers can be adjusted. To make the feature resolutions adjustable, the convolutional neural network model 106 can further include one or more down-sampling layers 108 configured to reduce the resolutions of the feature maps in the convolutional layers through down sampling operations. The adjustment of the feature resolutions can be achieved by changing the locations of the down-sampling layers within the convolutional neural network model 106.

Figure 2:
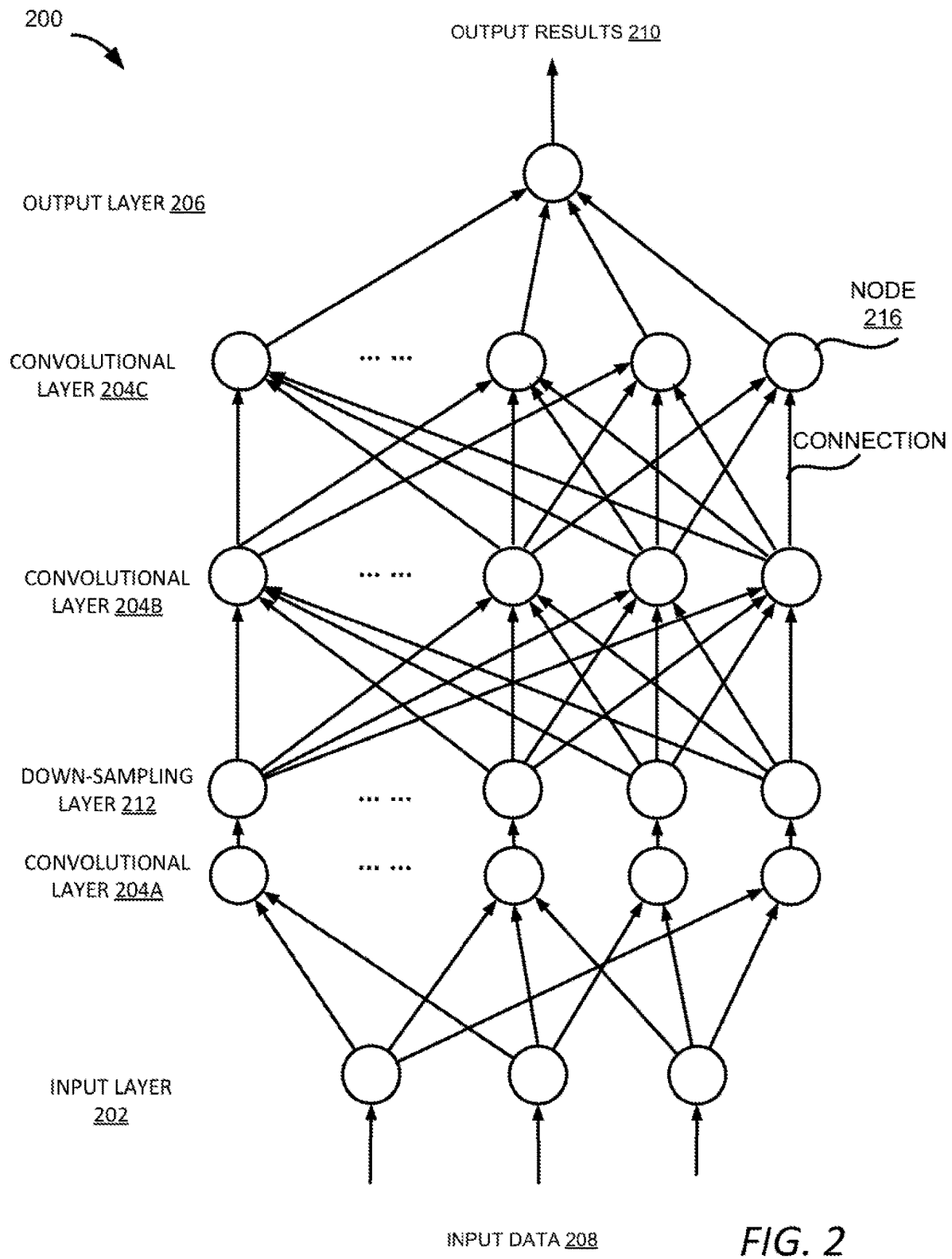
FIG. 2 depicts an example of a convolutional neural network model with adjustable feature resolutions at runtime, according to certain embodiments of the present disclosure.

FIG. 2 shows an example of a convolutional neural network model 200. In the example shown in FIG. 2, the convolutional neural network model 200 has an input layer 202 having three nodes to accept input data 208, for example, to accept the three color channels of an input image, respectively. The convolutional neural network model 200 further includes three convolutional layers 204A-204C each having multiple nodes connected to the nodes in other layers. Each connection between a pair of nodes from two different layers is associated with a weight. The weights of the connections can be utilized to determine the inputs to a current layer based on the output of the previous layer. The convolutional neural network model 200 further includes an output layer containing a node for generating the output results.

A node in the convolutional layers 204 can be configured to apply a filter to input data of that node. The input data can be determined from output data or feature maps generated by the previous layer (e.g., through a combination of the feature maps based on the weights of the connections). For example, the nodes in the first convolutional layer 204A can each implement a type of edge filter, such as a horizontal edge detector, a vertical edge detector, a diagonal edge detector, and so on. The outputs of these filters are the feature maps generated by the respective nodes in this layer. In some implementations, other operations, such as the pre-processing or post-processing of the feature map may also be performed in each node.

In the example shown in FIG. 2, a down-sampling layer is placed after the first convolutional layer 204A. As such, the feature maps generated by the nodes in the first convolutional layer 204A are further down-sampled before being sent to the next convolutional layer 204B. In some examples, each node in a down-sampling layer is configured to reduce the resolution of the feature map by a factor of two in both horizontal and vertical directions. Other down-sampling parameters may be used by the down-sampling layer.

The down-sampled versions of the feature maps from convolutional layer 204A are fed to the next convolutional layer 204B, where the feature maps are combined based on the weights of the connections and processed by the nodes in the convolutional layer 204B. The nodes in the second convolutional layer 204B may be configured to apply filters such as corner detectors to the input signal and generate feature maps accordingly. Similar to the second convolutional layer, the third convolutional layer can process the output of the second convolutional layer 204B by applying the filters at the third convolutional layer. The node in the output layer 206 combines the outputs of the third convolutional layer 204C to generate the final output results 210.

Because the down-sampling layer 212 is placed after the first convolutional layer 204A, the resolution of the feature map processed by the convolutional layer 204A is four times the resolution of the feature map processed by the convolutional layers 204B and 204C. If the down-sampling layer 212 is placed after the second convolutional layer 204B, then both convolutional layers 204A and 204B process feature maps with a higher resolution, while convolutional layer 204C processes feature maps with a lower resolution. The computing resources required to execute this version of the convolutional neural network model is higher than that shown in FIG. 2. If the down-sampling layer 212 is moved after the input layer, all three convolutional layers 204A-204C process low-resolution feature maps thereby requiring less computational resources than the model shown in FIG. 2. As such, by moving the location of the down-sampling layer 212 to different locations within the convolutional neural network model 106, the computational complexity of the convolutional neural network model 200 can be increased or decreased dynamically. While FIG. 2 only shows one down-sampling layer, multiple down-sampling layers can be included in a convolutional neural network model 106.

Returning back to FIG. 1, the model training application 104 employs a dynamic training process to train the convolutional neural network model 106. In this training process, the model training application 104 randomly or pseudo-randomly selects the architecture of the convolutional neural network model 106 at each iteration. The architecture of the convolutional neural network model 106 differs from one iteration to another iteration in terms of the locations of the one or more down-sampling layers within the model training application 104.

Based on the selected architecture of the convolutional neural network model 106, the model training application 104 can provide the training data 112 to the convolutional neural network model 106 to perform the current iteration of the training. The training can include, for example, determining and adjusting the weights of connections between the layers, generating and normalizing feature maps for each convolutional layer, generating output results, calculating the value of the loss function defined for the convolutional neural network model 106, and so on. Based on the value of the loss function, the model training application 104 can perform adjustments on the parameters of the convolutional neural network model 106, such as the weights of the connections, parameters of the convolutional layers (e.g., the parameters of the filters used in each convolutional layer). Further, because the resolution of the feature maps processed in a convolutional layer can be different for different iteration, the filters used in each of the convolutional layers need to be reconfigured before being applied to the input signal. The reconfiguration can include changing the dilation levels of the respective filters based on the resolution of the input signal. Additional details regarding adjustment made during training the convolutional neural network model 106 are provided below with regard to FIGS. 6 and 7. The above process is repeated until the training is finished, such as the value of the loss function is lower than a threshold value or the maximum number of iterations has reached.

The trained convolutional neural network model 106 can be deployed to one or more application computing system 116 over one or more networks 120 for execution. The application computing system 116 may represent one or more conventional server computers, Web servers, database servers, or network appliances. Alternatively, the application computing system 116 may represent a user computing device, such as a personal computer ("PC"), a desktop workstation, a laptop, a notebook, a tablet, a mobile device, an augmented reality device, and the like. An application computing system 116 can include executable instructions, for example program code, stored in one or more non-transitory computer-readable media. The application computing system 116 can also include one or more processing devices that are capable of executing program code to perform operations described herein. The network 120 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The application computing system 116 can have an application 114 installed thereupon to execute the convolutional neural network model 106. For example, the application 114 can include an image processing application configured to process input images. The image processing application may be implemented to execute the convolutional neural network model 106 to achieve certain functionalities, such as recognizing or detecting objects in an input image. Because the convolutional neural network model 106 is trained to allow the one or more down-sampling layers 108 to be moved to different locations to achieve different computational complexities, the application 114 can configure the architecture of the convolutional neural network model 106 at runtime based on the computational requirement for the convolutional neural network model 106.

The application 114 can receive a request to execute the convolutional neural network model 106. For example, a user may activate the application 114 to perform a function that involves the convolutional neural network model 106. Alternatively, or additionally, other components of the application 114 may request the execution of the convolutional neural network model 106. In response to such a request, the application 114 can determine the computational complexity requirement of the convolutional neural network model 106. The computational complexity requirement can be determined, for example, based on the computing resource available on the application computing system 116. For instance, the application 114 can communicate with a monitoring service on the application computing system 116 that is configured to monitor the computing resources on the application computing system 116 to determine the computing resources available for the convolutional neural network model 106.

The application 114 can also determine the computational requirement based on a programmed configuration. For example, the configuration can specify that if the convolutional neural network model 106 is the only model that is to be executed by the application 114, the convolutional neural network model 106 can be executed with its default architecture; if there is another model to be executed in parallel with the convolutional neural network model 106, the computational complexity of the convolutional neural network model 106 is to be reduced by half. If there are more than one other models to be executed in parallel with the convolutional neural network model 106, the computational complexity of the convolutional neural network model 106 needs to be further reduced, such as to be reduced to 1/N, where N is the number of the models to be executed in parallel. Other ways of determining the computational complexity requirement of the convolutional neural network model 106 can also be used.

Based on the computational complexity requirement, the application 114 can determine the locations of the down-sampling layers 108 so that the computational complexity requirement can be met. The application 114 can move the down-sampling layers 108 to the determined locations and execute the convolutional neural network model 106, for example, to generate object recognition predictions for an input image. Additional details regarding training and executing the convolutional neural network model 106 with adjustable feature resolutions at runtime are provided below with regard to FIGS. 3-7.

Figure 3:
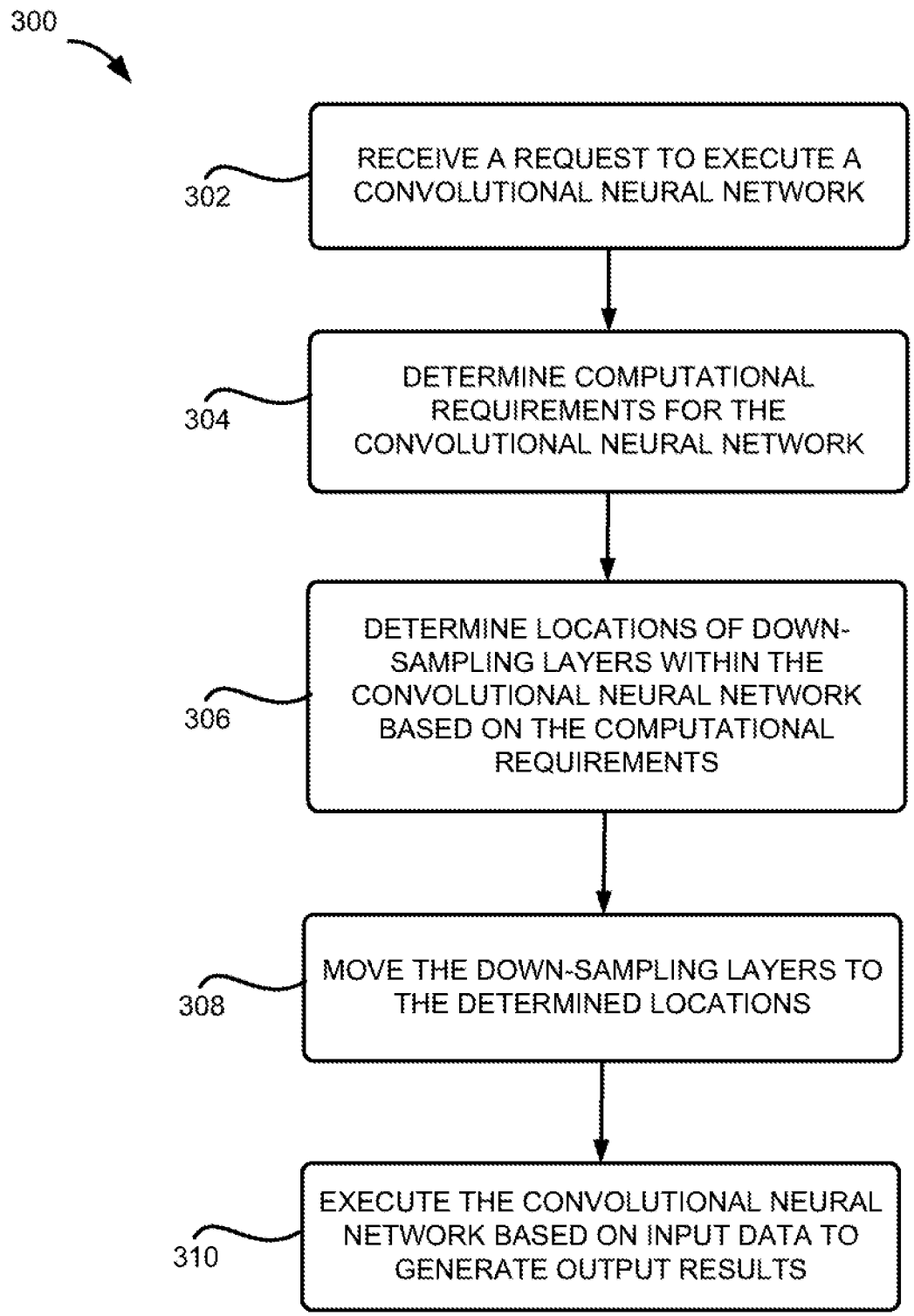
FIG. 3 depicts an example of a process for executing a convolutional neural network with adjustable feature resolutions at runtime to meet various computational complexity requirements, according to certain embodiments of the present disclosure.

Examples of Computer-Implemented Operations for Executing Spatially Slimmable Network FIG. 3 depicts an example of a process 300 for executing a convolutional neural network model 106 with adjustable feature resolutions at runtime to meet various computational complexity requirements, according to certain embodiments of the present disclosure. It should be noted that in the example of process 300 shown in FIG. 3, the convolutional neural network model 106 has been already been trained. The training process of the model is discussed below with respect to FIGS. 5-7. One or more computing devices (e.g., the application computing system 116) implement operations depicted in FIG. 3 by executing suitable program code (e.g., the application 114). For illustrative purposes, the process 300 is described with reference to certain examples depicted in the figures. Other implementations, however, are possible.

At block 302, the process 300 involves receiving a request to execute the convolutional neural network model 106. For instance, the application 114 can receive the request by a user operating in a user interface presented by the application 114 to activate the function provided by the convolutional neural network model 106, such as object recognition, object detection, content classification and so on. The application 114 might also receive the request from other components of the application 114, such as a component that relies on the output results of the convolutional neural network model 106 in order to proceed to the next step.

At block 304, the process 300 involves determining the computational complexity requirement for the convolutional neural network model 106. As discussed above with respect to FIG. 1, the computational complexity requirement can be determined based on the available computing resources on the application computing system 116, such as through communicating with a resource monitoring service of the application computing system 116. Alternatively, or additionally, the computational complexity requirement can be determined based on a programmed configuration. The configuration may specify that the computational complexity of the convolutional neural network model 106 need to be reduced when there are other models are executing or to be executed on the application computing system 116 in parallel with the convolutional neural network model 106.

At block 306, the process 300 involves determining the locations of down-sampling layers 108 of the convolutional neural network model 106 based on the computational complexity requirement. For example, if, according to the computational complexity requirement, the computational complexity of the convolutional neural network model 106 should be reduced due to reduced available computing resources, the application 114 can determine that the locations of the down-sampling layers 108 should be moved towards the input layer so that the feature maps processed by the convolutional layers have lower resolutions. If the available computing resources have increased, the down-sampling layers 108 can be moved toward the output layer so that the feature maps processed by the convolutional layers have higher resolutions and thus the generated results have higher accuracy.

For example, in the default architecture of the convolutional neural network model 200 shown in FIG. 2, the down-sampling layer 212 is located after the convolutional layer 204B. If according to the computational complexity requirement, the computational complexity of the convolutional neural network model 200 should be reduced, the application 114 can move the single down-sampling layer 212 toward the input layer 202, such as at the location shown in FIG. 2 or even after the input layer 202. If it is determined based on the computational complexity requirement that the computational complexity of the convolutional neural network model 200 can be increased, the application 114 can move the single down-sampling layer 212 to be after the second convolutional layer 204B or the third convolutional layer 204C.

FIGS. 4A-4D show another example of the convolutional neural network model 106. In these figures, the convolutional neural network model 106 has nine convolutional layers and two down-sampling layers. FIG. 4A shows the default architecture of the convolutional neural network model 106 in which one down-sampling layer is placed after the third convolutional layer and the second down-sampling layer is placed after the sixth convolutional layer. In this default architecture, the resolution of the feature maps processed by the first three convolutional layers is higher than that of the middle three convolutional layers and even higher than that of the last three convolutional layers.

These two down-sampling layers can be placed at different locations as shown in FIGS. 4B-4D to change the architecture of the convolutional neural network model 106 thereby changing the computational complexity of the convolutional neural network model 106. For instance, FIG. 4B shows an architecture of the convolutional neural network model 106 where the first down-sampling layer is placed after the first convolutional layer and the second down-sampling layer is placed after the fifth convolutional layer. This architecture leads to a lower computational complexity than the default architecture shown in FIG. 4A. If the computational complexity of the convolutional neural network model 106 needs to be further reduced, the two down-sampling layers can be placed at locations as shown in FIG. 4C or FIG. 4D.

Referring back to FIG. 3, at block 308, the process 300 involves reconfiguring the architecture of the convolutional neural network model 106 by moving the down-sampling layers 108 to the locations determined at block 306. At block 310, the process 300 involves executing the re-configured convolutional neural network model 106 on input data to generate output results.

Figure 5:
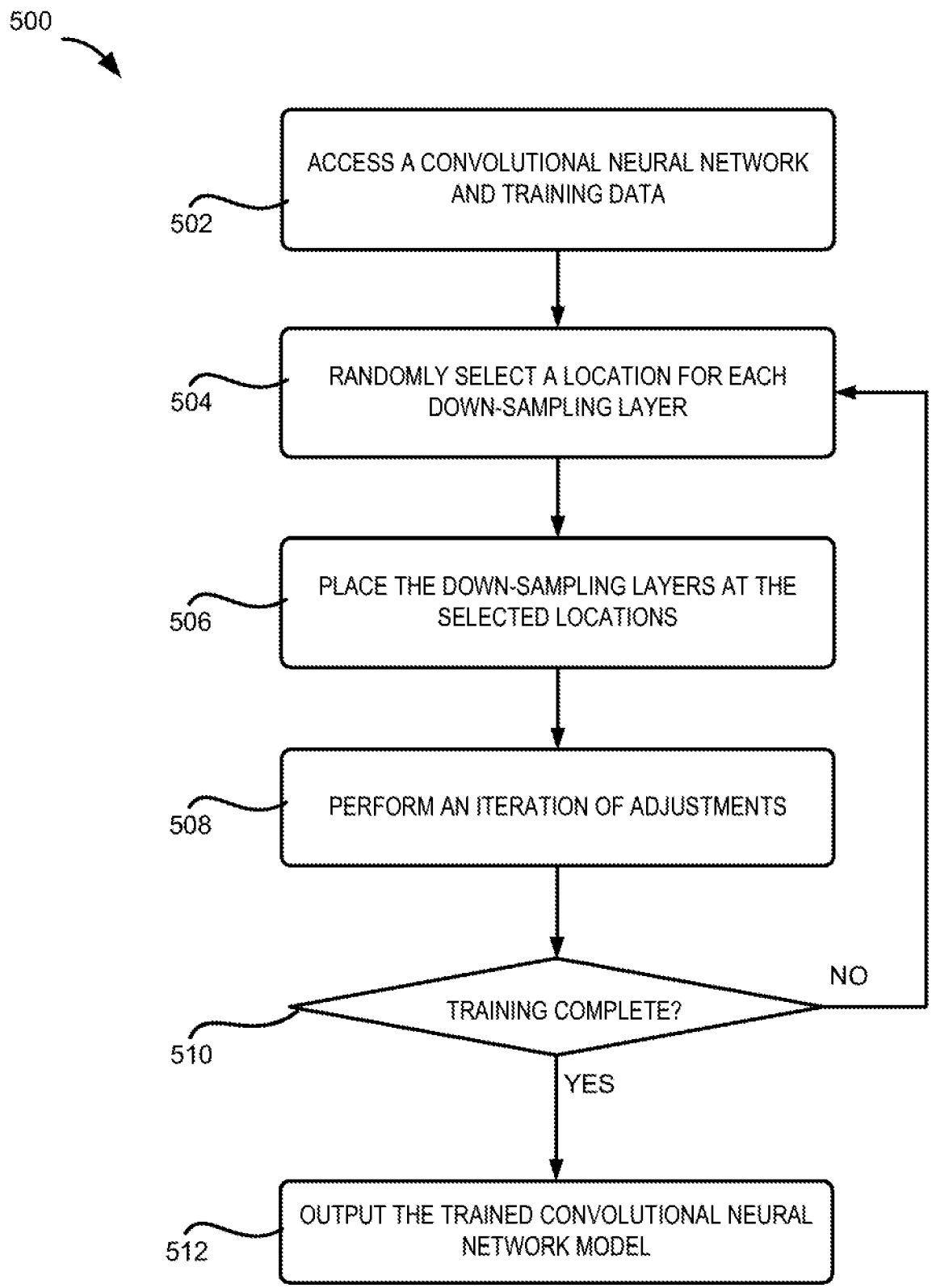
FIG. 5 depicts an example of a process for training a convolutional neural network with adjustable feature resolutions at runtime, according to certain embodiments of the present disclosure.

Examples of Computer-Implemented Operations for Training Spatially Slimmable Networks FIG. 5 depicts an example of a process 500 for training a convolutional neural network with adjustable feature resolutions at runtime, according to certain embodiments of the present disclosure. One or more computing devices (e.g., the model training system 102) implement operations depicted in FIG. 5 by executing suitable program code (e.g., the model training application 104). For illustrative purposes, the process 500 is described with reference to certain examples depicted in the figures. Other implementations, however, are possible.

At block 502, the process 500 involves accessing a convolutional neural network model 106 and the training data 112 for the convolutional neural network model 106. As described above, the convolutional neural network model 106 can include multiple convolutional layers and one or more down-sampling layers. At block 504, the process 500 involves randomly or pseudo-randomly selecting a location for each of the down-sampling layers among the possible locations of a down-sampling layer, such as after the input layer or after one of the convolutional layers. The locations of two down-sampling layers can be different or the same. If two down-sampling layers are placed at the same location, the feature maps for that convolutional layer can be down-sampled twice based on the down-sampling rates of the down-sampling layers.

At block 506, the process 500 involves placing the down-sampling layers at the selected locations. In some implementations, each layer of the convolutional neural network model 106, including the input layer and the convolutional layers, is configured with a down-sampling layer. For example, each node in a layer can include a component for down-sampling the feature map generated by that node. The component can be turned on or off to enable or disable the down-sampling functionality. As such, placing a down-sampling layer at a particular layer can be implemented by turning on the down-sampling component of that particular layer. Removing the down-sampling layer from a particular layer can be implemented by turning off the down-sampling component of that particular layer.

At block 508, the process 500 involves performing an iteration of the training to adjust the parameters of the convolutional neural network model 106 based on, for example, the value of the loss function associated with the convolutional neural network model 106. Details of the training procedure are provided below with regard to FIG. 6. At block 510, the process 500 involves determining if the training is complete. In some examples, the model training application 104 determines that the training is complete if the value of the loss function associated with the convolutional neural network model 106 is below a threshold value. The model training application 104 may also determine that the training is complete if the maximum number of iterations has reached. Various other criteria may be utilized to determine if the training of the convolutional neural network model 106 is complete.

If the model training application 104 determines that the training should continue, the process 500 involves, at block 504, randomly or pseudo-randomly selecting the locations for the down-sampling layers for the next iteration of the training. Blocks 506-508 can be repeated for the next iteration. If the model training application 104 determines that the training is complete, the process 500 involves, at block 512, outputting the trained convolutional neural network model 106 so that the model can be deployed to the application computing systems 116.

Figure 6:
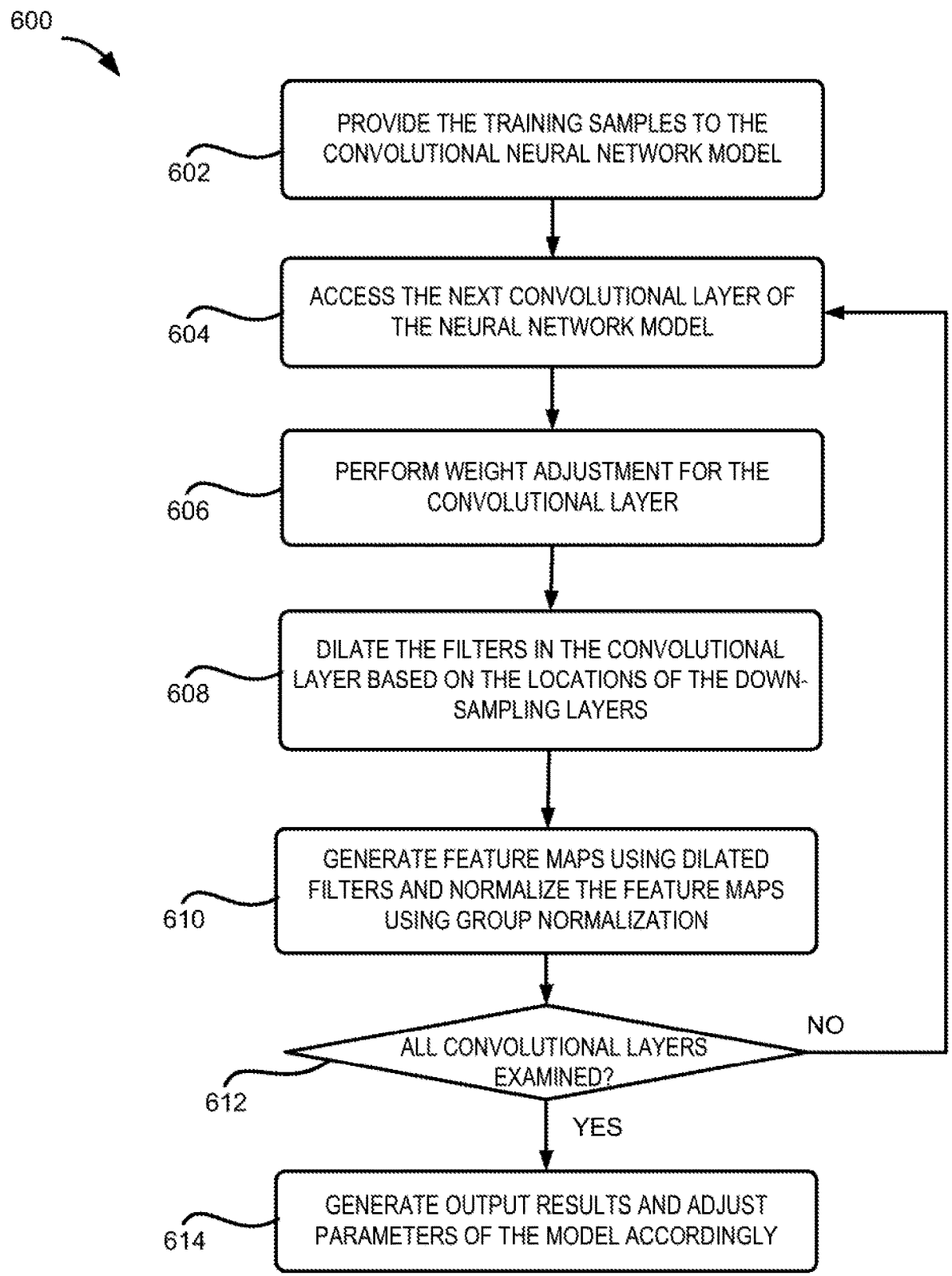
FIG. 6 depicts an example of a process for one iteration of training a convolutional neural network with adjustable feature resolutions at runtime, according to certain embodiments of the present disclosure.

FIG. 6 depicts an example of a process 600 for an iteration of the training of a convolutional neural network with adjustable feature resolutions at runtime, according to certain embodiments of the present disclosure. The process 600 can be utilized to implement block 508 of process 500 depicted in FIG. 5. The model training application 104 shown in FIG. 1 can be employed to implement the process 600.

At block 602, the process 600 involves providing the training data 112 to the input layer of the convolutional neural network model 106. At block 604, the process 600 involves accessing the next convolutional layer of the convolutional neural network model 106. At block 606, the process involves performing weight standardization for the weights of the connections associated with a node in the convolutional layer. In some examples, the model training application 104 performs the weight standardization based on the weights of incoming connections of a node of the convolutional layer. For instance, the incoming connections of node 216 in the convolutional layer 204C shown in FIG. 2 are the connections originated from the nodes in the previous convolutional layer 204B and ended at node 216. Statistics of the weights of these connections are calculated, such as the mean and standard deviation. Based on these statistics, the weights can be normalized or standardized by, for example, subtracting the mean from the weight and then dividing the result by the standard deviation.

At block 608, the process 600 involves dilating filters of the nodes in a convolutional layer based on the locations of the down-sampling layers so that the size of the filter matches the resolution of the feature maps being filtered. For the convolutional neural network model 106 with adjustable feature resolutions, the receptive fields of the filters in the nodes will change accordingly as the locations of the down-sampling layers change. For example, if the resolution is reduced by half, the receptive field of a 3×3 filter with respect to the input will increase by two. Thus, the receptive fields of the filter depend on the locations of the down-sampling layers, which may make the learning inconsistent.

To address this problem, the receptive fields of the filters need to be maintained constant when the locations of the down-sampling layers are changed. This can be achieved by changing the dilation configurations of the convolutional layers according to the locations of the down-sampling layers. For example, the width and the height of a filter can be configured to change linearly with respect to the dilation configurations of the convolutional layers. To keep the receptive field unchanged, the dilation of the filter in a convolutional layer can be decreased when a down-sampling layer is encountered.

Figure 7:
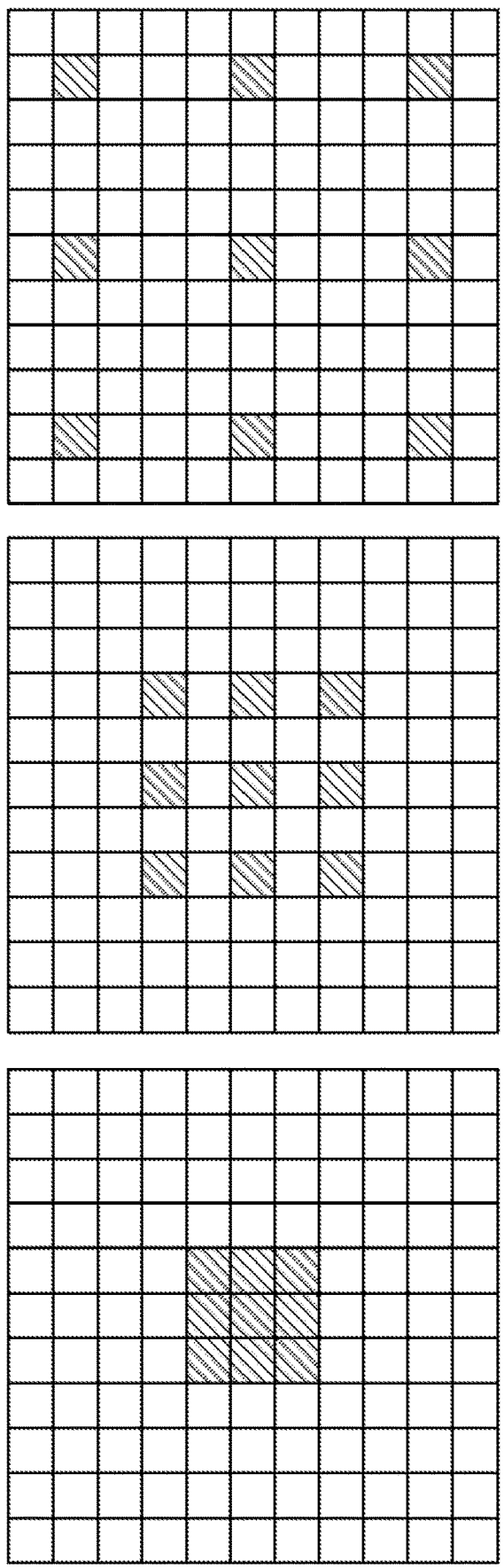
FIG. 7 depicts an example of a filter at different dilation levels, according to certain embodiments of the present disclosure.

Taking the 9-layer neural network model in FIG. 4A as an example, if the down-sampling layers each reduce the width and the height of a feature map by 2, the dilation level of the top three convolutional layers can be set to 1, the dilation level of the middle three convolutional layers can be set to 2, and the dilation level of the bottom three convolutional layers can be set to 4. These dilation configurations can keep the receptive fields of the filters the same even when the locations of the down-sampling layers are changed. Similarly, in the architecture shown in FIG. 4B, the dilation level of the top four convolutional layers can be set to 1, the dilation level of the middle four convolutional layers can be set to 2, and the dilation level of the bottom convolutional layer can be set to 4. FIG. 7 shows an example of a 3-by-3 filter at different dilation levels, where the shaded areas represent the coefficients of the filter.

At block 610, the process 600 involves generating feature maps using the dilated filters and normalizing the feature maps using group normalization. To perform group normalization, the model training application 104 can gather the feature maps generated by the nodes in the convolutional layer and calculate the statistics of the feature maps. Based on the statistics, such as the mean and standard deviation, the feature maps can be normalized. The normalized feature maps can be output to the next layer. If the current convolutional layer is followed by a down-sampling layer, the normalized feature maps are down-sampled before being provided to the next convolutional layer.

At block 612, the process 600 involves determining if all the convolutional layers have been examined. If not, the process 600 involves accessing the next convolutional layer, at block 604, and repeating blocks 606-610 as described above. If all the convolutional layers have been examined, the process 600 involves, at block 614, generating output results at the output layer of the convolutional neural network model 106 and adjusting the parameters of the convolutional neural network model 106 accordingly. For example, the model training application 104 can calculate the value of the loss function associated with the convolutional neural network model 106 based on the output results. According to the loss function, the model training application 104 can adjust the parameters of the convolutional neural network model 106, such as the weights of the connections, the coefficients of the filters, to reduce the value of the loss function.

Figure 8:
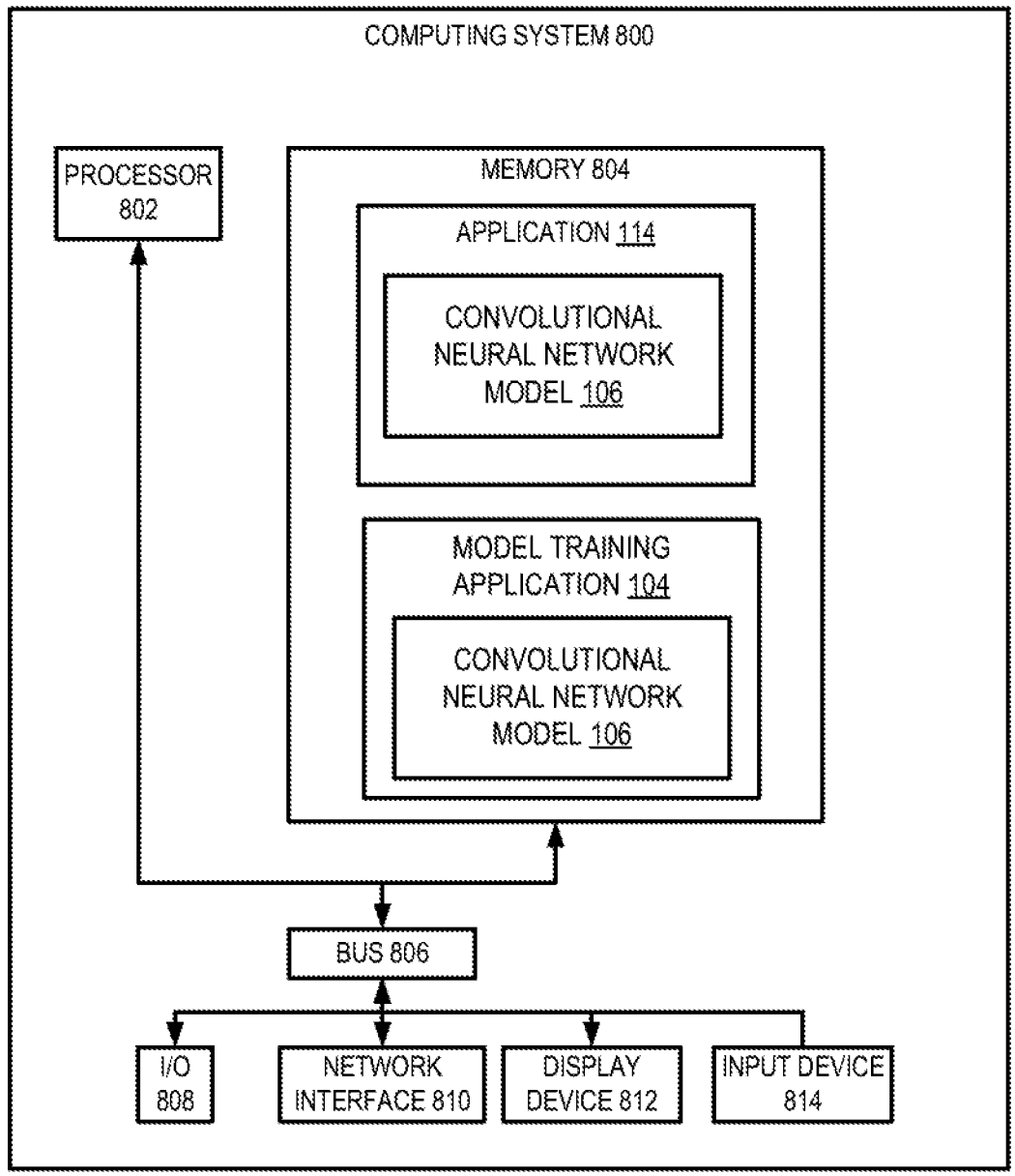
FIG. 8 depicts an example of a computing system that executes an image manipulation application for performing certain embodiments of the present disclosure.

Computing System Example for Training and Executing Spatially Slimmable Networks Any suitable computing system or group of computing systems can be used for performing the operations described herein. For example, FIG. 8 depicts an example of a computing system 800 that can implement the model training system 102 or the application computing system 116 of FIG. 1. In some embodiments, the computing system 800 includes a processing device 802 that executes the model training application 104 or the application 114, a memory that stores various data computed or used by the model training application 104 or the application 114, an input device 814 (e.g., a mouse, a stylus, a touchpad, a touchscreen, etc.), and a display device 812 that displays graphical content generated by the model training application 104 or the application 114. For illustrative purposes, FIG. 8 depicts a single computing system on which the model training application 104 or the application 114 is executed, and the input device 814 and display device 812 are present. But these applications, datasets, and devices can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 800 may also include a number of external or internal devices, such as an input device 814, a display device 812, or other input or output devices. For example, the computing system 800 is shown with one or more input/output ("I/O") interfaces 808. An I/O interface 808 can receive input from input devices or provide output to output devices. One or more buses 806 are also included in the computing system 800. The buses 806 communicatively couples one or more components of a respective one of the computing system 800.

The computing system 800 executes program code that configures the processing device 802 to perform one or more of the operations described herein. The program code includes, for example, the model training application 104, or the application 114 or other suitable applications that perform one or more operations described herein. The program code may be resident in the memory device 804 or any suitable computer-readable medium and may be executed by the processing device 802 or any other suitable processor. In some embodiments, components in the model training application 104 or the application 114 (e.g., the convolutional neural network model 106, etc.) are stored in the memory device 804, as depicted in FIG. 8. In additional or alternative embodiments, one or more of the components from the model training application 104 or the application 114 are stored in different memory devices of different computing systems.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices via a data network using the network interface device 810.

An input device 814 can include any device or group of devices suitable for receiving visual, auditory, or other suitable input that controls or affects the operations of the processing device 802. Non-limiting examples of the input device 814 include a touchscreen, stylus, a mouse, a keyboard, a microphone, a separate mobile computing device, etc. A display device 812 can include any device or group of devices suitable for providing visual, auditory, or other suitable sensory output. Non-limiting examples of the display device 812 include a touchscreen, a monitor, a separate mobile computing device, etc.

Although FIG. 8 depicts the input device 814 and the display device 812 as being local to the computing device that executes the model training application 104 or the application 114, other implementations are possible. For instance, in some embodiments, one or more of the input device 814 and the display device 812 can include a remote client-computing device that communicates with the computing system 800 via the network interface device 810 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A non-transitory computer-readable medium having program code that is stored thereon, the program code executable by one or more processing devices for performing operations comprising:

accessing a trained convolutional neural network model for execution on the one or more processing devices, wherein the trained convolutional neural network model comprises a plurality of convolutional layers;

determining a location for each of one or more down-sampling layers relative to the plurality of convolutional layers within the trained convolutional neural network model, the trained convolutional neural network model having been trained via a training process, wherein each down-sampling layer of the one or more down-sampling layers is configured to down-sample input data of the down-sampling layer to reduce a resolution of the input data of the down-sampling layer through down sampling operations, and wherein the training process comprises performing iterative adjustments of parameters of a convolutional neural network model, each iteration of the adjustments comprising:

selecting a location for each of the one or more down-sampling layers;

moving the one or more down-sampling layers to the selected locations;

generating output results by applying the convolutional neural network model on training samples; and adjusting the parameters of the convolutional neural network model based on the generated output results;

reconfiguring the trained convolutional neural network model by moving the one or more down-sampling layers to the respective determined locations;

executing the reconfigured trained convolutional neural network model to generate an output result;

determining a second location for each of the one or more down-sampling layers relative to the plurality of convolutional layers for execution on the one or more processing devices;

reconfiguring the trained convolutional neural network model by moving the one or more down-sampling layers to the respective determined second locations to generate a second reconfigured trained convolutional neural network model without re-training the trained convolutional neural network model; and executing the second reconfigured trained convolutional neural network model to generate a second output result.

2. The non-transitory computer-readable medium of claim 1, wherein the location for each of the one or more downsampling layers is determined based on computing resources available for the one or more processing devices.

3. The non-transitory computer-readable medium of claim 1, wherein the location for each of the one or more down-sampling layers is determined according to a programmed configuration.

4. The non-transitory computer-readable medium of claim 1, wherein each of the plurality of convolutional layers is configured with a down-sampling function, and wherein moving the one or more down-sampling layers to the respective locations comprises enabling the down-sampling function for convolutional layers located at the locations of the one or more down-sampling layers and disabling the down-sampling function for the rest of the plurality of the convolutional layers.

5. The non-transitory computer-readable medium of claim 1, wherein
the location for each of the one or more down-sampling layers during the training process is randomly selected.

6. The non-transitory computer-readable medium of claim 5, wherein each iteration of the adjustments further comprises:
normalizing weights of connections of a node in a convolutional layer of the trained convolutional neural network model based on statistics of the weights of connections of the node; and
normalizing a feature map generated by the node in the convolutional layer based on statistics of feature maps generated by nodes in the convolutional layer.

7. The non-transitory computer-readable medium of claim 1, wherein the operations further comprise changing dilation configurations of filters used in the plurality of convolutional layers based on the locations of the one or more down-sampling layers within the plurality of convolutional layers.

8. A computer-implemented method in which one or more processing devices perform operations comprising:
accessing training samples for a convolutional neural network model, the convolutional neural network model comprising a plurality of convolutional layers and one or more down-sampling layers, wherein each down-sampling layer of the one or more down-sampling layers is configured to down-sample input data of the down-sampling layer to reduce a resolution of the input data of the down-sampling layer through down sampling operations; and
performing iterative adjustments of parameters of the convolutional neural network model, wherein each iteration of the adjustments comprises:
determining a location for each of the one or more down-sampling layers relative to the plurality of convolutional layers within the trained convolutional neural network model;
randomly selecting a second location for each of the one or more down-sampling layers relative to the plurality of convolutional layers;
reconfiguring the trained convolutional neural network model by moving the one or more down-sampling layers to the respective selected second locations to generate a second reconfigured trained convolutional neural network model without re-training the trained convolutional network model;
generating output results by applying the convolutional neural network model on the training samples; and
adjusting the parameters of the convolutional neural network model based on the generated output results.

9. The computer-implemented method of claim 8, wherein each iteration of the adjustments further comprises normalizing weights of connections associated with a node of the convolutional neural network model based on statistics of the weights of the connections.

10. The computer-implemented method of claim 8, wherein each iteration of the adjustments further comprises normalizing a feature map generated by a node in a convolutional layer among the plurality of convolutional layers of the convolutional neural network model based on statistics of feature maps generated by nodes in the convolutional layer.

11. The computer-implemented method of claim 8, wherein each iteration of the adjustments further comprises changing dilation configurations of filters used in the plurality of convolutional layers of the convolutional neural network model based on the locations of the one or more down-sampling layers with respect to the plurality of convolutional layers.

12. The computer-implemented method of claim 11, wherein changing a dilation configuration of a filter of a node in a convolutional layer comprises changing a dilation level of the filter to match a receptive field of the filter of the node of the convolutional layer.

13. The computer-implemented method of claim 8, wherein executing the convolutional neural network model at a computing device comprises moving the one or more down-sampling layers of the convolutional neural network model according to computing resources available at the computing device.

14. A system comprising:
a processing device; and
a non-transitory computer-readable medium implementing a trained convolutional neural network model, comprising:
a plurality of convolutional layers, each of the plurality of convolutional layers configured for processing input data from a previous layer in the trained convolutional neural network model to generate output feature maps for a following layer in the trained convolutional neural network model; and
one or more down-sampling layers, wherein each down-sampling layer of the one or more down-sampling layers is configured to down-sample input data of the down-sampling layer to reduce a resolution of the input data of the down-sampling layer through down sampling operations, and wherein a location of each of the one or more down-sampling layers within the trained convolutional neural network model is determined dynamically at runtime for executing the trained convolutional neural network model without retraining;
the processing device being configured to execute program code stored in the non-transitory computer-readable medium and thereby perform operations comprising:
determining a location for each of the one or more down-sampling layers relative to the plurality of convolutional layers within the trained convolutional neural network model;
determining a second location for each of the one or more down-sampling layers relative to the plurality of convolutional layers for execution on the one or more processing devices;
reconfiguring the trained convolutional neural network model by moving the one or more down-sampling layers to the respective determined second locations to generate a second reconfigured trained convolutional neural network model without re-training the trained convolutional neural network model.

15. The system of claim 14, wherein the processing device is configured to execute program code stored in the non-transitory computer-readable medium and thereby perform operations comprising:
reconfiguring the trained convolutional neural network model by moving the one or more down-sampling layers to the respective locations; and
executing the trained convolutional neural network model to generate an output result.

16. The system of claim 15, wherein the location of each of the one or more down-sampling layers is determined based on computing resources available to the one or more processing devices or according to a programmed configuration.

17. The system of claim 15, wherein the trained convolutional neural network model is trained by:
accessing training samples; and
performing iterative adjustments of parameters of the trained convolutional neural network model, wherein each iteration of the adjustments comprises:
randomly selecting a location for each of the one or more down-sampling layers;
moving the one or more down-sampling layers to the selected locations;
generating output results by applying the trained convolutional neural network model on the training samples; and
adjusting the parameters of the trained convolutional neural network model based on the generated output results.

18. The system of claim 17, wherein the parameters of the trained convolutional neural network model comprise weights of connections between the plurality of convolutional layers, and wherein each iteration of the adjustments further comprises normalizing the weights of connections associated with a node of the trained convolutional neural network model based on statistics of the weights of connections associated with the node.

19. The system of claim 18, wherein each iteration of the adjustments further comprises normalizing a feature map generated by the node based on statistics of feature maps generated by nodes in a convolutional layer where the node is located.

20. The system of claim 15, wherein the operations further comprise changing dilation configurations of filters used in the plurality of convolutional layers based on the locations of the one or more down-sampling layers relative to the plurality of convolutional layers.

* * * * *